US009811686B1

(12) United States Patent
Marquardt et al.

(10) Patent No.: US 9,811,686 B1
(45) Date of Patent: Nov. 7, 2017

(54) SUPPORT SYSTEMS INTERACTIONS WITH VIRTUAL NETWORK FUNCTIONS IN A TRUSTED SECURITY ZONE

(71) Applicant: Sprint Communications Company L.P., Overland Park, KS (US)

(72) Inventors: Ronald R. Marquardt, Woodinville, WA (US); Lyle W. Paczkowski, Mission Hills, KS (US); Arun Rajagopal, Leawood, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 116 days.

(21) Appl. No.: 14/879,324

(22) Filed: Oct. 9, 2015

(51) Int. Cl.
*H04L 29/06* (2006.01)
*G06F 21/62* (2013.01)
*G06Q 30/04* (2012.01)

(52) U.S. Cl.
CPC ......... *G06F 21/6245* (2013.01); *G06Q 30/04* (2013.01)

(58) Field of Classification Search
CPC .................................................. G06F 21/6245
See application file for complete search history.

(56) References Cited

U.S. PATENT DOCUMENTS

| | | | |
|---|---|---|---|
| 5,928,363 A | 7/1999 | Ruvolo | |
| 5,983,350 A | 11/1999 | Minear et al. | |
| 6,775,772 B1 | 8/2004 | Binding et al. | |
| 7,305,712 B2 | 12/2007 | Watt et al. | |
| 7,325,083 B2 | 1/2008 | Watt et al. | |
| 7,340,573 B2 | 3/2008 | Watt | |
| 7,370,210 B2 | 5/2008 | Symes | |
| 7,661,104 B2 | 2/2010 | Watt et al. | |
| 7,702,951 B2 | 4/2010 | Yamamoto et al. | |
| 7,849,296 B2 | 12/2010 | Watt et al. | |
| 8,090,797 B2 | 1/2012 | Chinta et al. | |
| 8,171,483 B2 | 5/2012 | Nord et al. | |
| 8,271,976 B2 | 9/2012 | Vega et al. | |
| 8,280,944 B2 | 10/2012 | Laadan et al. | |
| 8,443,230 B1 | 5/2013 | James-Roxby et al. | |

(Continued)

FOREIGN PATENT DOCUMENTS

WO  WO2015039699 A1  3/2015
WO  WO2017062101 A1  4/2017

OTHER PUBLICATIONS

Notice of Allowance dated Oct. 5, 2016, U.S. Appl. No. 14/746,615, filed Jun. 22, 2015.

(Continued)

*Primary Examiner* — Shawnchoy Rahman

(57) ABSTRACT

An apparatus, comprising a network communication interface to communicatively couple the apparatus to a network, a processor coupled to the network communication interface, a memory coupled to the processor and comprising a trusted security zone, and a trusted orchestrator application stored in the trusted security zone of the memory that. When the application is executed by the processor, it receives fully-detailed data from a virtualized network function of a virtual server via a trusted end-to-end communication link, wherein the data comprises a log of events performed by the virtual network function for a customer. The application then sanitizes the data received from the virtualized network function and transmits the sanitized data outside of the trusted security zone.

20 Claims, 8 Drawing Sheets

(56) References Cited

U.S. PATENT DOCUMENTS

| | | | |
|---|---|---|---|
| 8,649,770 B1* | 2/2014 | Cope | G06F 21/53 370/217 |
| 8,712,407 B1 | 4/2014 | Cope et al. | |
| 8,797,875 B2 | 8/2014 | Garcia Martin et al. | |
| 8,842,578 B1 | 9/2014 | Zisapel et al. | |
| 8,935,318 B1* | 1/2015 | Konerding | G06F 9/5072 709/203 |
| 8,984,110 B1 | 3/2015 | Asveren | |
| 8,996,644 B2 | 3/2015 | Pope | |
| 9,047,441 B2* | 6/2015 | Xie | |
| 9,104,836 B2 | 8/2015 | Burstein et al. | |
| 9,161,227 B1 | 10/2015 | Bye et al. | |
| 9,183,606 B1 | 11/2015 | Paczkowski et al. | |
| 9,191,865 B1 | 11/2015 | Paczkowski et al. | |
| 9,230,085 B1 | 1/2016 | Paczkowski et al. | |
| 9,237,084 B2 | 1/2016 | Chapman | |
| 9,282,898 B2 | 3/2016 | McRoberts et al. | |
| 9,288,148 B1 | 3/2016 | Krishnaswamy et al. | |
| 9,298,515 B2 | 3/2016 | McMurry et al. | |
| 9,324,016 B1 | 4/2016 | Cordes et al. | |
| 9,374,363 B1* | 6/2016 | Paczkowski | H04L 63/083 |
| 9,384,028 B1 | 7/2016 | Felstaine et al. | |
| 9,392,446 B1 | 7/2016 | Paczkowski et al. | |
| 9,407,612 B2 | 8/2016 | Sood et al. | |
| 9,450,866 B2 | 9/2016 | He et al. | |
| 9,460,286 B1 | 10/2016 | Felstaine et al. | |
| 9,503,363 B2 | 11/2016 | Sivabalan et al. | |
| 9,509,587 B1 | 11/2016 | Marquardt et al. | |
| 9,519,563 B2 | 12/2016 | Manghirmalani et al. | |
| 9,537,741 B2 | 1/2017 | Chakrabarti et al. | |
| 9,549,321 B2 | 1/2017 | Slavov et al. | |
| 9,565,168 B1 | 2/2017 | Marquardt et al. | |
| 9,578,664 B1 | 2/2017 | Paczkowski et al. | |
| 9,613,190 B2* | 4/2017 | Ford | G06F 21/10 |
| 9,686,240 B1 | 6/2017 | Ray et al. | |
| 2002/0091650 A1* | 7/2002 | Ellis | G06Q 20/383 705/74 |
| 2002/0107958 A1 | 8/2002 | Faraldo | |
| 2003/0177387 A1 | 9/2003 | Osterwalder et al. | |
| 2004/0139352 A1 | 7/2004 | Shewchuk et al. | |
| 2004/0177269 A1 | 9/2004 | Belnet et al. | |
| 2004/0181682 A1 | 9/2004 | Orino et al. | |
| 2004/0187117 A1 | 9/2004 | Orion et al. | |
| 2004/0240468 A1 | 12/2004 | Chin et al. | |
| 2004/0260910 A1 | 12/2004 | Watt et al. | |
| 2005/0102603 A1 | 5/2005 | Tapper et al. | |
| 2005/0114616 A1 | 5/2005 | Tune et al. | |
| 2005/0138421 A1 | 6/2005 | Fedronic et al. | |
| 2005/0160210 A1 | 7/2005 | Watt et al. | |
| 2005/0185672 A1 | 8/2005 | Endo et al. | |
| 2006/0146767 A1 | 7/2006 | Moganti | |
| 2006/0190614 A1 | 8/2006 | Altman et al. | |
| 2006/0253701 A1 | 11/2006 | Kim et al. | |
| 2007/0174253 A1* | 7/2007 | Hodnett | G06Q 30/06 |
| 2008/0020745 A1 | 1/2008 | Bae et al. | |
| 2008/0162877 A1 | 7/2008 | Altman et al. | |
| 2008/0165259 A1 | 7/2008 | Nobels | |
| 2008/0301779 A1 | 12/2008 | Garg et al. | |
| 2009/0007100 A1 | 1/2009 | Field et al. | |
| 2009/0199177 A1 | 8/2009 | Edwards et al. | |
| 2009/0241108 A1 | 9/2009 | Edwards et al. | |
| 2009/0300605 A1 | 12/2009 | Edwards et al. | |
| 2009/0320048 A1 | 12/2009 | Watt et al. | |
| 2010/0106568 A1* | 4/2010 | Grimes | G06Q 30/02 705/14.1 |
| 2010/0192230 A1 | 7/2010 | Steeves et al. | |
| 2011/0119748 A1 | 5/2011 | Edwards et al. | |
| 2011/0173443 A1 | 7/2011 | Osterwalder et al. | |
| 2012/0040662 A1 | 2/2012 | Rahman et al. | |
| 2012/0304244 A1* | 11/2012 | Xie | G06F 21/00 726/1 |
| 2012/0331550 A1 | 12/2012 | Raj et al. | |
| 2013/0055256 A1 | 2/2013 | Banga et al. | |
| 2013/0091568 A1 | 4/2013 | Sharif et al. | |
| 2013/0305333 A1* | 11/2013 | Katzer | G06F 21/6245 726/7 |
| 2013/0333008 A1* | 12/2013 | Tapling | H04L 63/04 726/7 |
| 2013/0345530 A1 | 12/2013 | McRoberts et al. | |
| 2014/0013327 A1 | 1/2014 | Sherwood et al. | |
| 2014/0033316 A1 | 1/2014 | Paczkowski et al. | |
| 2014/0047548 A1 | 2/2014 | Bye et al. | |
| 2014/0052922 A1 | 2/2014 | Moyer et al. | |
| 2014/0053003 A1 | 2/2014 | Moyer et al. | |
| 2014/0075567 A1* | 3/2014 | Raleigh | H04W 12/10 726/26 |
| 2014/0201374 A1 | 7/2014 | Ashwood-Smith et al. | |
| 2014/0241247 A1 | 8/2014 | Kempf et al. | |
| 2014/0259115 A1 | 9/2014 | Bakshi et al. | |
| 2014/0281529 A1 | 9/2014 | Epp et al. | |
| 2014/0281544 A1 | 9/2014 | Paczkowski et al. | |
| 2014/0298477 A1 | 10/2014 | Castro et al. | |
| 2014/0304803 A1 | 10/2014 | Pope et al. | |
| 2014/0325681 A1 | 10/2014 | Kleidermacher et al. | |
| 2014/0337940 A1 | 11/2014 | Slavov et al. | |
| 2014/0344912 A1 | 11/2014 | Chapman, II et al. | |
| 2014/0373012 A1 | 12/2014 | Ylitalo et al. | |
| 2015/0046676 A1 | 2/2015 | Archibald et al. | |
| 2015/0072726 A1 | 3/2015 | Stern | |
| 2015/0074745 A1 | 3/2015 | Stern et al. | |
| 2015/0074764 A1 | 3/2015 | Stern | |
| 2015/0089246 A1 | 3/2015 | Kanai et al. | |
| 2015/0117409 A1 | 4/2015 | Ghai | |
| 2015/0117455 A1 | 4/2015 | Umesh et al. | |
| 2015/0180730 A1 | 6/2015 | Felstaine et al. | |
| 2015/0195281 A1 | 7/2015 | Venkataramu et al. | |
| 2015/0220937 A1* | 8/2015 | Iannace | G06Q 30/0201 705/7.29 |
| 2015/0244717 A1 | 8/2015 | Jin et al. | |
| 2015/0248283 A1 | 9/2015 | Gschwind et al. | |
| 2015/0358248 A1 | 12/2015 | Saha et al. | |
| 2015/0365352 A1 | 12/2015 | Xiang | |
| 2015/0370704 A1 | 12/2015 | Kato | |
| 2015/0373050 A1 | 12/2015 | Dayan et al. | |
| 2015/0381423 A1 | 12/2015 | Xiang | |
| 2016/0043944 A1 | 2/2016 | Felstaine et al. | |
| 2016/0057102 A1 | 2/2016 | Wei et al. | |
| 2016/0057788 A1 | 2/2016 | Sharma et al. | |
| 2016/0073283 A1 | 3/2016 | Grayson et al. | |
| 2016/0080323 A1 | 3/2016 | MacKay et al. | |
| 2016/0094573 A1 | 3/2016 | Sood et al. | |
| 2016/0127333 A1 | 5/2016 | Sood et al. | |
| 2016/0142396 A1* | 5/2016 | McRoberts | A61B 5/0022 726/7 |
| 2016/0149921 A1 | 5/2016 | Potlapally et al. | |
| 2016/0157084 A1 | 6/2016 | Tsubouchi | |
| 2016/0170848 A1 | 6/2016 | Yang et al. | |
| 2016/0180089 A1 | 6/2016 | Dalcher | |
| 2016/0182567 A1 | 6/2016 | Sood et al. | |
| 2016/0205004 A1 | 7/2016 | Chou et al. | |
| 2016/0212016 A1 | 7/2016 | Vrzic et al. | |
| 2016/0212620 A1 | 7/2016 | Paczkowski et al. | |
| 2016/0219076 A1 | 7/2016 | Paczkowski et al. | |
| 2016/0226663 A1 | 8/2016 | Jones et al. | |
| 2016/0226912 A1 | 8/2016 | Clark et al. | |
| 2016/0226913 A1 | 8/2016 | Sood et al. | |
| 2016/0323200 A1 | 11/2016 | Xiang et al. | |
| 2016/0337329 A1 | 11/2016 | Sood et al. | |
| 2016/0350150 A1 | 12/2016 | Marquardt et al. | |
| 2016/0352537 A1 | 12/2016 | Marquardt et al. | |
| 2016/0366123 A1 | 12/2016 | Smith et al. | |
| 2016/0373474 A1 | 12/2016 | Sood et al. | |
| 2016/0378685 A1 | 12/2016 | Spurlock et al. | |
| 2017/0005990 A1 | 1/2017 | Birger et al. | |
| 2017/0012968 A1 | 1/2017 | Feng et al. | |
| 2017/0012975 A1 | 1/2017 | Ilyadis et al. | |
| 2017/0102957 A1 | 4/2017 | Marquardt et al. | |

OTHER PUBLICATIONS

Notice of Allowance dated Sep. 20, 2016, U.S. Appl. No. 14/703,885, filed May 5, 2015.

(56) References Cited

OTHER PUBLICATIONS

Foreign Communication from a Related Counterpart—International Search Report and Written Opinion dated Oct. 21, 2016, filed on Aug. 11, 2016, International Application No. PCT/US2016/046648.
Hwang, Jinho, et al., entitled, "NetVM: High Performance and Flexible Networking Using Virtualization on Commodity Platforms," 11th USENIX Symposium on Networked Systems Design and Implementation (NSDI '14); Apr. 2-5, 2014, Seattle WA, US, ISBN 978-1-931971-09-06.
Marquardt, Ronald R., et al., "System and Method for Trusted Operability When Moving Between Network Functions Virtualization States," filed on Aug. 11, 2016, International Application No. PCT/US2016/046648.
Bales, Mark R., et al., "Session Aggregator Brokering of Data Stream Communication," filed on Oct. 3, 2016, U.S. Appl. No. 15/284,506.
FAIPP Pre-Interview Communication dated Feb. 7, 2017, U.S. Appl. No. 14/847,992, filed Sep. 8, 2015.
FAIPP Pre-Interview Communication dated Mar. 9, 2017, U.S. Appl. No. 14/930,146, filed Nov. 2, 2015.
Notice of Allowance dated Feb. 21, 2017, U.S. Appl. No. 14/793,344, filed Jul. 7, 2015.
Paczkowski, Lyle W., et al., "Trusted Signaling in 3GPP Interfaces in a Network Function Virtualization Wireless Communication System," filed Jan. 10, 2017, U.S. Appl. No. 15/403,166.
FAIPP Pre-Interview Communication dated Jul. 25, 2016, U.S. Appl. No. 14/703,885, filed May 5, 2015.
Network Functions Virtualisation, "An Introduction, Benefits, Enablers, Challenges & Call for Action," Oct. 22-24, 2012, "SDN an OpenFlow World Congress," Darmstadt-Germany.
Network Functions Virtualisation, "Network Operator Perspectives on Industry Progress," Oct. 14-17, 2012, "SDN an OpenFlow World Congress," Darmstadt-Germany.
Paczkowski, Lyle W., et al., "Trusted Signaling in 3GPP Interfaces in a Network Function Virtualization Wireless Communication System," filed Jun. 22, 2015, U.S. Appl. No. 14/746,615.
Marquardt, Ronald R., et al., "System and Method of a Trusted Computing Operation Mode," filed May 5, 2015, U.S. Appl. No. 14/703,885.
Marquardt, Ronald R., et al., "System and Method of Establishing Trusted Operability Between Networks in a Network Functions Virtualization Environment," filed Sep. 8, 2015, U.S. Appl. No. 14/847,992.
Marquardt, Ronald R., et al., "Dynamic Addition of Network Function Services," filed on Nov. 2, 2015, U.S. Appl. No. 14/930,146.
Marquardt, Ronald R., et al., "Securing Communication in a Network Function Virtualization (NFV) Core Network," filed on Oct. 1, 2015, U.S. Appl. No. 14/872,936.
Marquardt, Ronald R., et al., "System and Method for Trusted Operability When Moving Between Network Functions Virtualization States," filed on Oct. 9, 2015, U.S. Appl. No. 14/879,327.
Ray, Amar N., et al., "IPv6 to IPv4 Data Packet Migration in a Trusted Security Zone," filed Jul. 7, 2015, U.S. Appl. No. 14/793,344.
Notice of Allowance dated May 12, 2017, U.S. Appl. No. 15/403,166, filed Jan. 10, 2017.
Notice of Allowance dated Apr. 25, 2017, U.S. Appl. No. 14/847,992, filed Sep. 8, 2015.
Notice of Allowance dated May 26, 2017, U.S. Appl. No. 14/930,146, filed Nov. 2, 2015.
Ray, Amar N., et al., "IPv6 to IPv4 Data Packet Migration in a Trusted Security Zone," filed May 22, 2017, U.S. Appl. No. 15/602,057.

* cited by examiner

SUPPORT SYSTEMS INTERACTIONS WITH VIRTUAL NETWORK FUNCTIONS IN A TRUSTED SECURITY ZONE

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Cloud computing, distributed computing, and services provided in a virtualized environment are gaining in popularity. Such growth in popularity is spurred on further as costs for providing services in a virtualized environment decrease and make virtualization a feasible alternative to dedicated hardware. Accompanying the growth in popularity of virtualized services is a corresponding desire to transition from proprietary and dedicated hardware solutions to general purpose or off-the-shelf options for computing hardware. As such, in some circumstances it may be desirable to provide alternatives for mechanisms that are intended for use with multiple proprietary hardware pieces in order to facilitate a transition to virtualized services operating on general purpose computing hardware while maintaining a same or similar level of security as existed in the prior hardware solutions.

SUMMARY

In an embodiment, an apparatus comprising a network communication interface to communicatively couple the apparatus to a network, a processor coupled to the network communication interface, a memory coupled to the processor and comprising a trusted security zone, and a trusted orchestrator application stored in the trusted security zone of the memory are disclosed. When executed by the processor, the trusted orchestrator receives fully-detailed data from a virtualized network function of a virtual server via a trusted end-to-end communication link, wherein the data comprises a log of events performed by the virtual network function for a customer. The trusted orchestrator then sanitizes the data received from the virtualized network function, and transmits the sanitized data outside of the trusted security zone.

In an embodiment, a method executed in a communications network comprising receiving by a transceiver in a trusted security zone, a log of event details for billing events executed by a virtualized network function from the virtualized network function, wherein the billing events indicate events for which a customer should be billed. The method also includes sanitizing by a processor, the log of event details to remove information having a predetermined level of specificity, wherein sanitizing the log of events comprises transforming the log of event details into categories. The method further includes transmitting by the transceiver, the sanitized log of event details.

In an embodiment, a method executed in a communications network comprising receiving by a transceiver in a trusted security zone, a log of event details for network events executed by a virtualized network function from the virtualized network function, wherein the network events indicate a network activity that should take place on a network. The method also includes sanitizing by a processor, the log of event details to remove information having a predetermined level of specificity. The method further includes transmitting by the transceiver, the sanitized log of event details.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
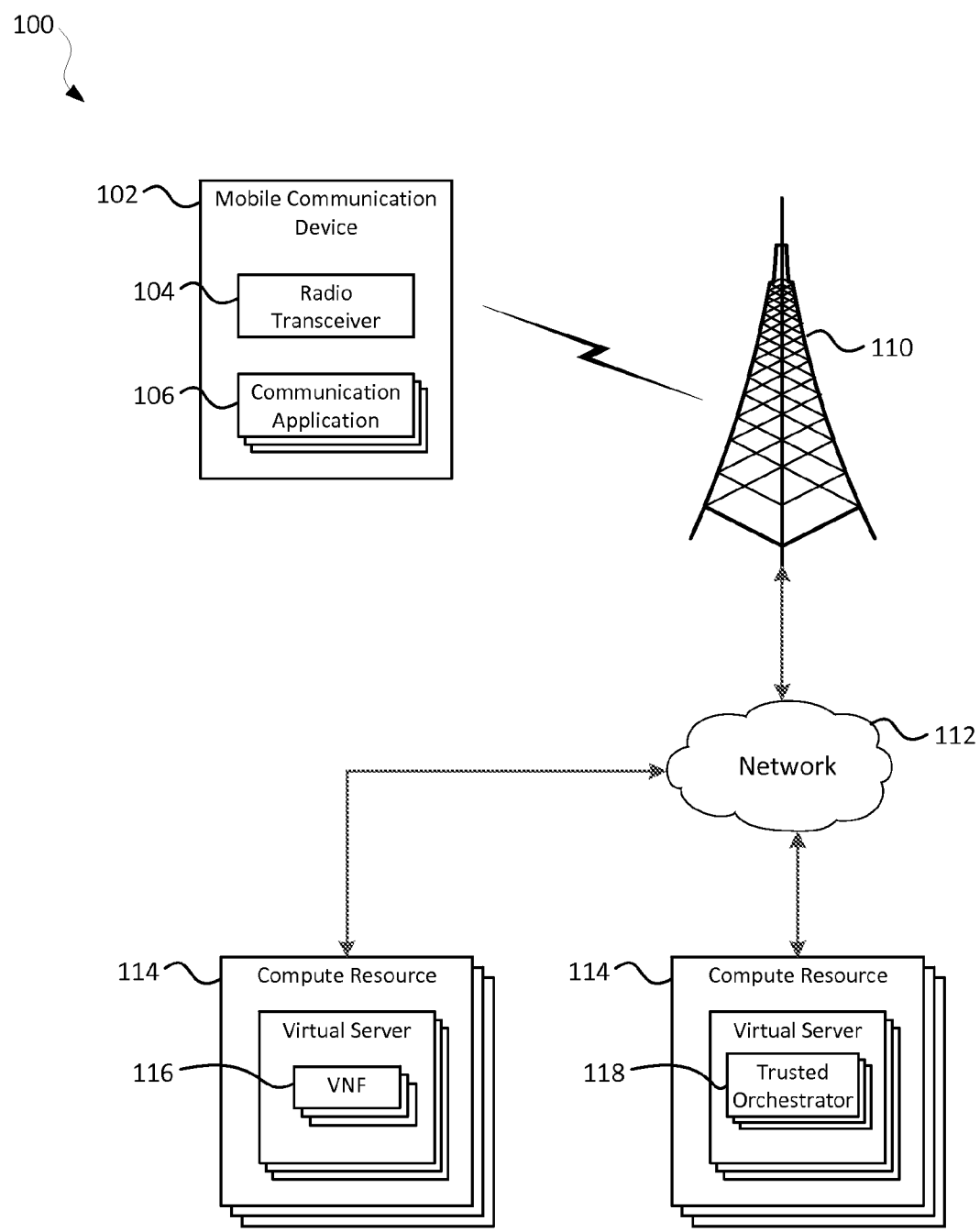
FIG. 1 illustrates an embodiment of a communication system.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

The move to a cloud-computing environment presents opportunities to create new approaches for ensuring the security of information. For network functions that are implemented according to software solutions in a cloud-computing environment, a trusted security zone may be established in which the network functions operate. To maintain the trusted nature of the system and track events for billing and operational purposes, a trusted orchestrator is introduced into the trusted security zone to receive from virtualized network functions and process trust data into a non-trust form. A billing support system and an operational support system are implemented at least in part in the trusted orchestrator, and therefore the trusted security zone, to facilitate billing and network inventory and operational functions resulting from event logs for events that take place in the virtual network functions that are located in the trusted security zone and are unable to share the original event logs outside of trust.

For example, the trusted orchestrator is implemented in a trusted security zone of a memory and/or a processor of a computing device, thereby transforming the computing device into a particular specialized hardware device. The trusted orchestrator is configured to implement one or more trustlets (e.g., a billing support system trustlet and/or an operational support system trustlet) that have an ability to communicate with devices that exist outside of trust. The trusted orchestrator is further configured to receive trusted data from one or more virtualized network functions that exist in a trusted security zone. In certain embodiments, the trusted data is not permitted to be divulged outside of the trusted security zone without removing and/or sanitizing at least some of the trusted data such that the trusted data that is divulged outside of the trusted security zone is not capable of identifying a source of the trusted data. The trusted orchestrator transforms the trusted data into abstracted data that provides useful function for a communications network, but does not break the trusted security zone by providing trusted data outside of the trusted security zone. After transforming the trusted data into abstracted data that may be transmitted outside of the trusted security zone, the trustlets of the trusted orchestrator transmit the abstracted data out of the trusted orchestrator and the trusted security zone to another system in the communications network to enable the communications network to provide functions for the customer.

For example, for billing a customer in a wireless communications network and performing network maintenance and inventory services, a knowledge of the customer's activities may be desired. However, when the customer has chosen to operate in a trusted security zone, information about their activities that is sufficient for billing or network operations purposes may not be transmittable outside of the trusted security zone, and thereby may inhibit billing and or network operations related to those activities. Moreover, unless trust is breached, the activities that occur within the trusted security zone are effectively hidden from view by any device that is outside of the trusted security zone. Implementing a complete billing support system and/or operational support system within a trusted security zone, thereby creating trusted and non-trusted duplicated versions of these systems, may be cost and/or resource prohibitive. Therefore, a subset or portion of the systems may be implemented as trustlets in the trusted security zone in a trusted orchestrator.

The trusted orchestrator then receives data from virtualized network functions that is considered trusted data because it is the result of activities conducted by a customer while inside a trusted security zone. The billing support system and operation support system rely upon at least a portion of the trusted data to perform their functions properly, however because these systems are outside of trust and the data is trusted data, the data may not be directly transmitted to the systems. The trusted orchestrator interprets the data and transforms it into abstracted data that contains sufficient details and/or information that the billing support system and operational support systems may perform their functions properly, but does not include specific identifying information about the customer or the customer's activities within the trusted security zone. Further, as the only device that has knowledge of the trusted data to which a particular abstracted data corresponds, the trusted orchestrator provides and maintains an audit trail for the abstracted data.

In determining what abstracted information is sufficient to provide billing and/or network operations services, the trusted orchestrator may receive input from the trustlets. The trustlets implemented in the trusted orchestrator serve as an interface between the trusted orchestrator and the outside systems of which they are a part. The trustlets provide information to the trusted orchestrator for processing the trusted data into abstracted data and then transmit the data to their respective external systems, thereby enabling the external systems to provide billing and network operations services to a client according to activities performed by the client, despite those activities taking place within the trusted security zone that should not be broken for billing and network operations according to traditional methods.

A trusted security zone provides chipsets with a hardware root of trust, a secure execution environment for applications, and secure access to peripherals. A hardware root of trust means the chipset should only execute programs intended by the device manufacturer or vendor and resists software and physical attacks, and therefore remains trusted to provide the intended level of security. The chipset architecture is designed to promote a programmable environment that allows the confidentiality and integrity of assets to be protected from specific attacks. Trusted security zone capabilities are becoming features in both wireless and fixed hardware architecture designs. Providing the trusted security zone in the main mobile device chipset and protecting the hardware root of trust removes the need for separate secure hardware to authenticate the device or user. To ensure the integrity of the applications requiring trusted data, such as a mobile financial services application, the trusted security zone also provides the secure execution environment where only trusted applications can operate, safe from attacks. Security is further promoted by restricting access of non-trusted applications to peripherals, such as data inputs and data outputs, while a trusted application is running in the secure execution environment. In an embodiment, the trusted security zone may be conceptualized as hardware assisted security.

A complete trusted execution environment (TEE) may be implemented through the use of the trusted security zone hardware and software architecture. The trusted execution environment is an execution environment that is parallel to the execution environment of the main mobile device operating system. The trusted execution environment and/or the trusted security zone may provide a base layer of functionality and/or utilities for use of applications that may execute in the trusted security zone. For example, in an embodiment, trust tokens may be generated by the base layer of functionality and/or utilities of the trusted execution environment and/or trusted security zone for use in trusted end-to-end communication links to document a continuity of trust of the communications. Through standardization of application programming interfaces (APIs), the trusted execution environment becomes a place to which scalable deployment of secure services can be targeted. A device which has a chipset that has a trusted execution environment on it may exist in a trusted services environment, where devices in the trusted services environment are trusted and protected against attacks. The trusted execution environment can be implemented on mobile phones and tablets as well as extending to other trusted devices such as personal computers, servers, sensors, medical devices, point-of-sale terminals, industrial automation, handheld terminals, automotive, etc.

The trusted security zone is implemented by partitioning all of the hardware and software resources of the mobile device into two partitions: a secure partition and a normal partition. The secure partition may be implemented by a first physical processor, and the normal partition may be implemented by a second physical processor. Alternatively, the secure partition may be implemented by a first virtual processor, and the normal partition may be implemented by a second virtual processor. Placing sensitive resources in the secure partition can protect against possible attacks on those resources. For example, resources such as trusted software applications may run in the secure partition and have access to hardware peripherals such as a touchscreen or a secure location in memory. Less secure peripherals such as wireless radios may be disabled completely while the secure partition is being accessed, while other peripherals may only be accessed from the secure partition. While the secure partition is being accessed through the trusted execution environment, the main mobile operating system in the normal partition is suspended, and applications in the normal partition are prevented from accessing the secure peripherals and data. This prevents corrupted applications or malware applications from breaking the trust of the device.

The trusted security zone is implemented by partitioning the hardware and software resources to exist in a secure subsystem which is not accessible to components outside the secure subsystem. The trusted security zone is built into the processor architecture at the time of manufacture through hardware logic present in the trusted security zone which enables a perimeter boundary between the secure partition and the normal partition. The trusted security zone may only be manipulated by those with the proper credential and, in an embodiment, may not be added to the chip after it is manufactured. Software architecture to support the secure partition may be provided through a dedicated secure kernel running trusted applications. Trusted applications are independent secure applications which can be accessed by normal applications through an application programming interface in the trusted execution environment on a chipset that utilizes the trusted security zone.

In an embodiment, the normal partition applications run on a first virtual processor, and the secure partition applications run on a second virtual processor. Both virtual processors may run on a single physical processor, executing in a time-sliced fashion, removing the need for a dedicated physical security processor. Time-sliced execution comprises switching contexts between the two virtual processors to share processor resources based on tightly controlled mechanisms such as secure software instructions or hardware exceptions. The context of the currently running virtual processor is saved, the context of the virtual processor being switched to is restored, and processing is restarted in the restored virtual processor. Time-sliced execution protects the trusted security zone by stopping the execution of the normal partition while the secure partition is executing.

The two virtual processors context switch via a processor mode called monitor mode when changing the currently running virtual processor. The mechanisms by which the processor can enter monitor mode from the normal partition are tightly controlled. The entry to monitor mode can be triggered by software executing a dedicated instruction, the Secure Monitor Call (SMC) instruction, or by a subset of the hardware exception mechanisms such as hardware interrupts, which can be configured to cause the processor to switch into monitor mode. The software that executes within monitor mode then saves the context of the running virtual processor and switches to the secure virtual processor.

The trusted security zone runs a separate operating system that is not accessible to the device users. For security purposes, the trusted security zone is not open to users for installing applications, which means users do not have access to install applications in the trusted security zone. This prevents corrupted applications or malware applications from executing powerful instructions reserved to the trusted security zone and thus preserves the trust of the device. The security of the system is achieved at least in part by partitioning the hardware and software resources of the mobile phone so they exist in one of two partitions, the secure partition for the security subsystem and the normal partition for everything else. Placing the trusted security zone in the secure partition and restricting access from the normal partition protects against software and basic hardware attacks. Hardware logic ensures that no secure partition resources can be accessed by the normal partition components or applications. A dedicated secure partition operating system runs in a virtual processor separate from the normal partition operating system that likewise executes in its own virtual processor. Users may install applications on the mobile device which may execute in the normal partition operating system described above. The trusted security zone runs a separate operating system for the secure partition that is installed by the mobile device manufacturer or vendor, and users are not able to install new applications in or alter the contents of the trusted security zone.

Network function virtualization (NFV) is an architecture by which functions are implemented on general purpose computing hardware utilizing one or more virtual machines, each configured to emulate custom and/or purpose built computing hardware such that the general purpose computing hardware is capable of executing software, processes, functions, and/or services that are intended for the purpose built hardware. In some embodiments, the general purpose computing hardware may be referred to as an "off-the-shelf" computing device or a commodity device. Each software, process, function, and/or service that is intended for the purpose built computing hardware is encapsulated as a specific function known as a virtualized network function (VNF) for execution by the general purpose computing hardware. For example, virtualized network functions may be implemented that provide the functions of one or more components of a network, for example the functions of a network component, an instant message service component, a serving gateway, a packet data gateway, or other hardware used to provide voice, data, and/or instant message services to a customer. In some embodiments, virtualized network functions may be implemented to provide all functions of a network, for example, a long-term evolution (LTE) network, such as voice services, data services, and/or instant message services. Implementing the functions of network components as virtualized network functions may remove a hardware dependency of the functions and create a software-based function.

In performing a particular task or responding to a particular request or event, one or more virtualized network functions may be used. In some embodiments, the virtualized network functions exist on a single piece of general purpose computing hardware. In such embodiments, the general purpose computing hardware is transformed into a specialized device that is configured specifically to implement and/or perform the virtualized network functions. In other embodiments, the virtualized network functions may be distributed across one or more pieces of general purpose computing hardware in a single network, for example, multiple pieces of general purpose computing hardware located in a single data center, or in cloud-computing environment, for example, multiple pieces of general purpose computing hardware distributed across one or more data centers. Similarly, in each of these embodiments the general purpose computing hardware is transformed into a specialized device that is configured specifically to implement and/or perform the virtualized network functions without regard for the distributed nature of the virtualized network functions.

Turning now to FIG. 1, an embodiment of a communication system 100 is disclosed. In an embodiment, the system 100 comprises user equipment (UE) 102, an enhanced node B (eNB) 110, a network 112, and a network server 114, which may in some embodiments be referred to as a compute resource. The UE 102 may comprise a radio transceiver 104, and one or more communication applications 106. The UE 102 is configured to use the radio transceiver 104 to establish a wireless communication link with the eNB 110, and the eNB 110 provides communications connectivity of the UE 102 to the network 112. The network 112 may comprise any combination of private and/or public networks. One or more network servers 114 may be coupled to network 112 and receive and/or transmit information to UE 102.

It is understood that the system 100 may comprise any number of UEs 102, eNBs 110, and network servers 114. The collectivity of eNBs 110 may be said to comprise a radio access network, in that these eNBs 110 may provide a radio communication link to the UE 102 to provide access to the network 112. The radio access network may be abstracted in different ways and may comprise, in addition to the eNBs 110, servers and data stores such as home location registers (HLRs) or servers that implement the functionality of home location registers, visitor location registers (VLRs) or servers that implement the functionality of visitor location registers, base station controllers (BSCs), mobile switching centers (MSCs), and other network nodes that are specifically associated with providing wireless access and connectivity to the UEs 102.

It is also understood that the eNB 110 may comprise any number of devices that facilitate wireless communication between UE 102 and network 112. For example, the eNB 110 may be a base transceiver station (BTS), a radio base station (RBS), a node B, or any other device that facilitates wireless communication between UE 102 and network 112.

The radio transceiver 104 may communicate with the eNB 110 using any of a variety of wireless communication protocols including a code division multiple access (CDMA) wireless communication protocol, a global system for mobile communication (GSM) wireless communication protocol, a LTE wireless communication protocol, a worldwide interoperability for microwave access (WiMAX) wireless communication protocol, or another wireless communication protocol. The UE 102 may be any of a mobile phone, a personal digital assistant (PDA), a media player, a wireless enabled computer, or other mobile communication device. In an embodiment, the UE 102 may have other components (not shown) such as a near field communication (NFC) radio transceiver, a wireless local area network (WLAN) radio transceiver, or other components.

The communication applications 106 may comprise a voice communication application, a data communication application, a web browser application, an email application, a short message system (SMS) or texting application, an instant message system (IMS) application, a multimedia message system (MMS) application, and/or other communication applications. The communication applications 106 may be standard communication applications that are delivered by an original equipment manufacturer (OEM) who assembles the UE 102 or may be third-party applications added to the UE 102 by a user. The communication applications 106 may be stored as firmware or software in a trusted memory area of the UE 102. The communication applications 106 may expose application programming interfaces (APIs) accessible to other applications to provide wireless communication functionality to the other applications.

In some embodiments, the network server 114 may implement network function virtualization and comprise one or more virtualized network functions 116. The virtualized network functions 116 may provide services in communication system 100 for the UE 102. For example, virtualized network functions 116 may provide UE 102 with access to paid content, may increase and/or decrease service offerings made available to UE 102, and/or may provide UE 102 with any other data or offerings traditionally offered by purpose built computing hardware.

In an embodiment, virtualized network functions 116 are implemented at least in part in a trusted security zone, as described above. The trusted security zone securely isolates data and processes used in the virtualized network functions 116 from access outside of the trusted security zone. Each virtual network function 116 may support one or more customers at a given time, with each customer operating in an individual virtual slice that is inaccessible to other customer's virtual slices. A network server 114, operating one or more virtualized network functions 116 in a trusted security zone, may be assigned all or in part to a customer such that substantially all operations of the customer take place in the trusted security zone, isolated from outside access. A trusted orchestrator 118 interfaces between the virtualized network functions 116 located inside the trusted security zone and the area outside of the trusted security zone.

Figure 2:
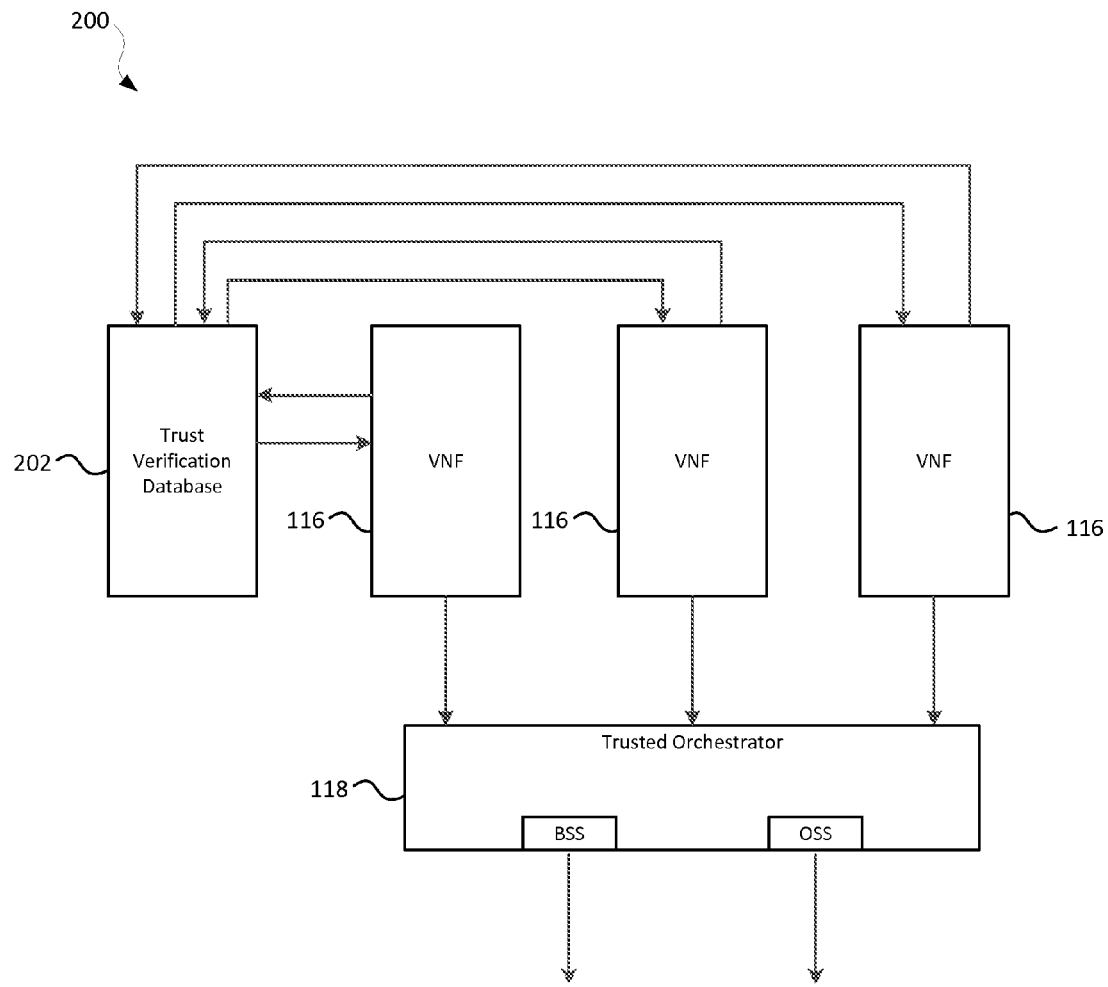
FIG. 2 illustrates an embodiment of a process.

FIG. 2 depicts a schematic diagram of an embodiment of a process 200. Process 200 demonstrates virtualized network functions 116, shown in FIG. 1, operating in a trusted security zone and communicatively coupled to trusted orchestrator 118, also shown in FIG. 1, and a trust verification database 202. Optionally, in some embodiments, process 200 executes on one or more virtualized servers on top of one or more hypervisors and/or other virtualization software that provides a logical rather than physical interface to an underlying physical compute resource. Also in some embodiments, virtualized network functions 116 are collocated with trusted orchestrator 118, but in other embodiments may be located on a different piece of computing hardware.

In an embodiment, virtualized network functions 116 receive a request, for example a request from the UE 102, shown in FIG. 1, to perform a function. The function may be, for example, provisioning a network function and/or service for a customer, adjusting the network resources such as voice, data, and/or messaging capacity available to the customer, or any other LTE event or functions that results from customer requests or interaction with the network. The trusted security zone in which virtualized network functions 116 are located may specify that some or all of the particular data pertaining to functions performed by the virtualized network functions 116 be maintained in trust as privileged data with restricted access. For example, access to the data may be restricted to individuals authorized by the customer to access the data.

Trusted orchestrator 118 may receive data from virtualized network functions 116 pertaining to the functions provided to a customer by the virtualized network functions 116. Trusted orchestrator 118 is located at least partially in the trusted security zone, and as such may receive some or all of the data pertaining to functions performed by the virtualized network functions 116 without limitation. Trusted orchestrator 118 is shared between the virtualized network functions 116 such that trusted security orchestrator 118 has a view of the entire trusted security zone without limitation. In an embodiment, the data may be provided to the trusted orchestrator 118 by the virtualized network functions 116 as metadata. For example, the virtualized network functions 116 may publish the metadata to a limited application programming interface from which the trusted orchestrator 118 receives the metadata. Alternatively, the virtualized network functions 116 may transmit the metadata directly to the trusted orchestrator. In an embodiment, the data received by the trusted orchestrator 118 from the virtualized network functions 116 may be received via a trusted end-to-end communication link. For further details of trusted end-to-end communication links see U.S. patent application Ser. No. 13/532,588, filed Jun. 25, 2012, entitled "End-to-End Trusted Communications Infrastructure," by Leo Michael McRoberts, et al., which is incorporated herein by reference in its entirety.

After transmitting the data to the trusted orchestrator 118, the virtualized network functions 116 retain a complete copy of the data with all details pertaining to the functions provided to the customer by the virtualized network functions 116. The retained copy of data is maintained in trust, and is available only in the trusted security zone to individuals with appropriate access. The retained data may comprise an audit trail to, for example, demonstrate adherence to industry regulation, provide a recording of activity for use in a billing dispute initiated by a customer, and/or satisfy other requirements where the complete data is needed. As such, the retained data and the data transmitted to the trusted orchestrator 118 may comprise a log of events that have taken place in the virtualized network functions 116 and/or a record of actions to be taken by an entity outside of the trusted security zone. For example, the data may comprise a record of billing events for which the customer will be charged. As another example, the data may comprise a record of network faults, errors, and/or alarms that indicate a failure of the virtualized network function 116 in whole or in part.

The trusted orchestrator 118 incorporates at least a portion of an operational support system (OSS) and/or a billing support system (BSS) within the trusted security zone. The aspects of the operational support system and billing support system that are incorporated in trusted orchestrator 118 may be referred to as trustlets. A trustlet may be thought of as an extract of a complete application—an extract of the specific instructions that desirably execute in a trusted security zone. The portion of the application that need not execute in the trusted security zone may be said to execute in the rich environment or permissive environment. As such, in an embodiment, the operational support system and billing support system trustlets incorporated in trusted orchestrator 118 comprise a portion of those respective systems, sufficient to provide the trusted orchestrator 118 with the ability to sanitize the data received from virtualized network functions 116 in a manner that retains a minimum level of specificity in the data such that the data may be accurately interpreted and utilized by the respective systems outside of the trusted security zone.

The operational support system maintains an inventory of the network by performing events correlation, for example correlating an error reported by a virtual network function 116 to a particular piece of network hardware or area of the network, by managing the life cycle of events occurring in the network, and/or perform non-billing network related functions such as activating or deactivating a service for a customer and provisioning or de-provisioning network resources or applications for a customer.

The data that is transmitted to the trusted orchestrator 118 is sanitized to remove identifying information and preserve the trusted security zone before the data is passed to the operational support system and the billing support system for use and/or transmission outside of process 200. As such, in an embodiment, the specific data pertaining to functions performed by the virtualized network functions 116 is abstracted to one or more general categories and/or subcategories of actions. In an embodiment, the trusted orchestrator 118 may abstract data that is to be sent to the billing support system into general categories that correspond to a billing metric and have as minimum an amount of information as is necessary to perform billing. As an example, detailed customer usage logs received from a virtualized network function 116 may be abstracted to include only an indication of use tonnage, such as a total number of messages sent and/or received, a total number of voice minutes used, a total amount of network throughput utilized, a total number of time slots utilized, and/or a number of process cycles consumed. As another example, detailed customer usage logs received from a virtualized network function 116 may be abstracted to indicate only a service consumed by a customer, for example from a services catalog, such as a security service, for example a virtual private network (VPN) service, an application deployment service, for example receiving access to a software application or virtual function, and/or a quality of service request, for example a customer requesting a certain amount of bandwidth, low-latency, an overall quantity of events transacted by the customer, an overall quantity of applications initiated by the customer, an overall quantity of services terminated by the customer, or other network characteristic for a given period of time. Other examples include abstracting all various monetary transactions, for example a credit card transaction, debit card transaction, wire transfer, automated clearing house transfer and/or other similar monetary transactions to a general category of financial transaction, or abstracting a click on an online advertisement to include only the fact that an advertisement click took place without including the starting destination, end destination, or timing information.

In another embodiment, the trusted orchestrator 118 may abstract data that is to be sent to the operational support system into abstracted general information that indicates an activity that should be performed for a customer or a piece of network equipment that requires service or replacement. For example, a virtual network function 116 may provide data to trusted orchestrator 118 that indicates an error has occurred on a particular piece of network equipment while a function was being performed for a customer. In an embodiment, the trusted orchestrator 118 would abstract the error data to a general category of network error that indicates a service function to be performed and a location for performing that service while omitting unique or identifying information such as which functions are operating on the network equipment requiring service, what functions were being performed on the network equipment when the failure requiring service occurred, and/or which one or more customers were utilizing the network equipment when the failure requiring service occurred.

For embodiments in which the virtualized network functions are implemented on a plurality of computing hardware pieces, a trust verification database 202 may be implemented. The trust verification database 202 may serve as a record of trusted hardware such that a virtualized network function 116 can query the trust verification database 202 to determine whether the particular computing hardware piece on which the virtualized network function 116 is operating is a trusted piece of computing hardware. The trust verification database 202 may then provide a response to the querying virtualized network function 116 that indicates whether the piece of computing hardware on which the virtualized network function 116 is located is trusted, and is therefore able to operate in process 200 and maintain the trusted security zone.

Figure 3:
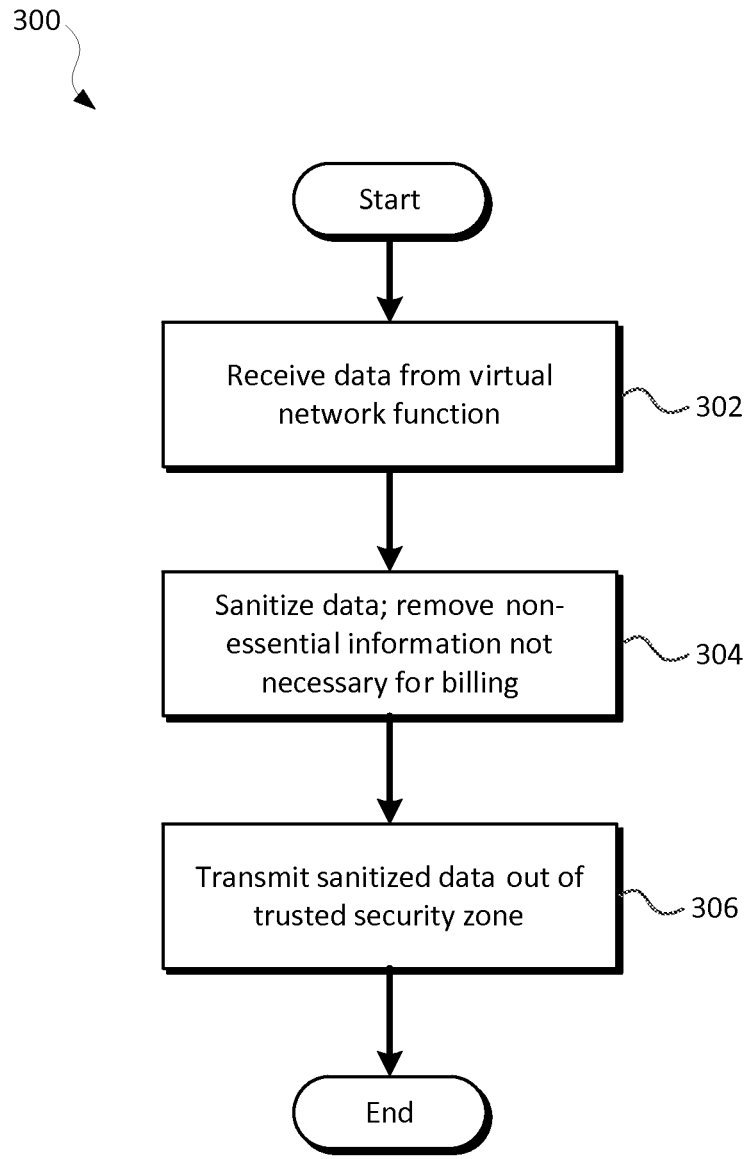
FIG. 3 illustrates an embodiment of a flowchart of a method.

FIG. 3 is an embodiment of a flowchart of a method 300. At step 302, a trusted orchestrator, such as trusted orchestrator 118, shown in FIG. 1, receives data from a virtualized network function, such as virtualized network function 116, shown in FIG. 1. The data received by the trusted orchestrator comprises a log of event details for events having been executed by the virtualized network function and that will be billed to a customer. At step 304, the trusted orchestrator sanitizes the data, removing all or substantially all information that is non-essential to billing, such that a trusted nature of data received from the virtualized network function is maintained. Sanitizing the data comprises abstracting the data into general categories that are representative of events that were executed by the virtualized network function but lack specific detail or identifying information. At step 306, the sanitized data is transmitted by the trusted orchestrator to a billing support system for billing to a customer. In some embodiments, the trusted orchestrator may use the sanitized data to generate a bill for delivery to a customer in place of transmitting the sanitized data to a billing support system.

Figure 4:
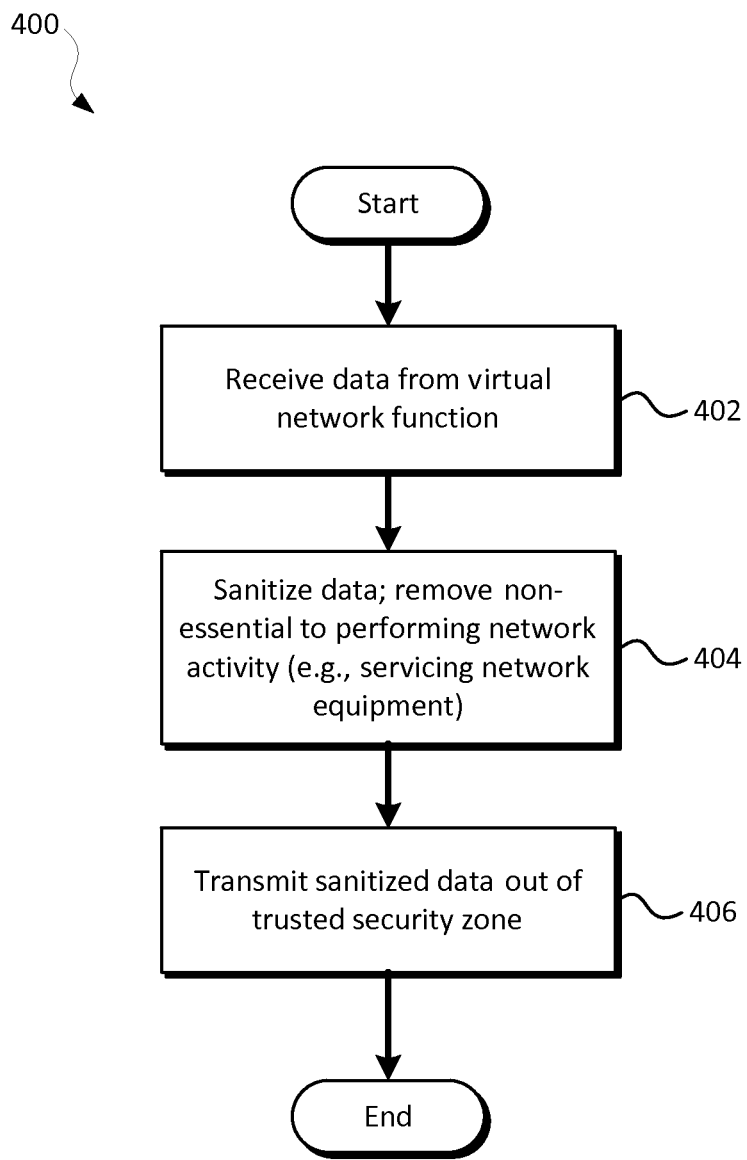
FIG. 4 illustrates an embodiment of a flowchart of a method.

FIG. 4 is an embodiment of a flowchart of a method 400. At step 402, a trusted orchestrator, such as trusted orchestrator 118, shown in FIG. 1, receives data from a virtualized network function, such as virtualized network function 116, shown in FIG. 1. The data received by the trusted orchestrator comprises a log of event details for events having been executed by the virtualized network function and that indicate an action that should be performed in the network. For example, the action may be servicing a portion of the network. At step 404, the trusted orchestrator sanitizes the data, removing all or substantially all information that is non-essential to identifying the portion of the network that desires service. Sanitizing the data comprises abstracting the data to indicate only a portion of the network or a specific piece of network equipment that desires service without indicating what activity was taking place when the fault causing the network to desire service occurred. At step 406, the sanitized data is transmitted by the trusted orchestrator to an operational support system.

Figure 5:
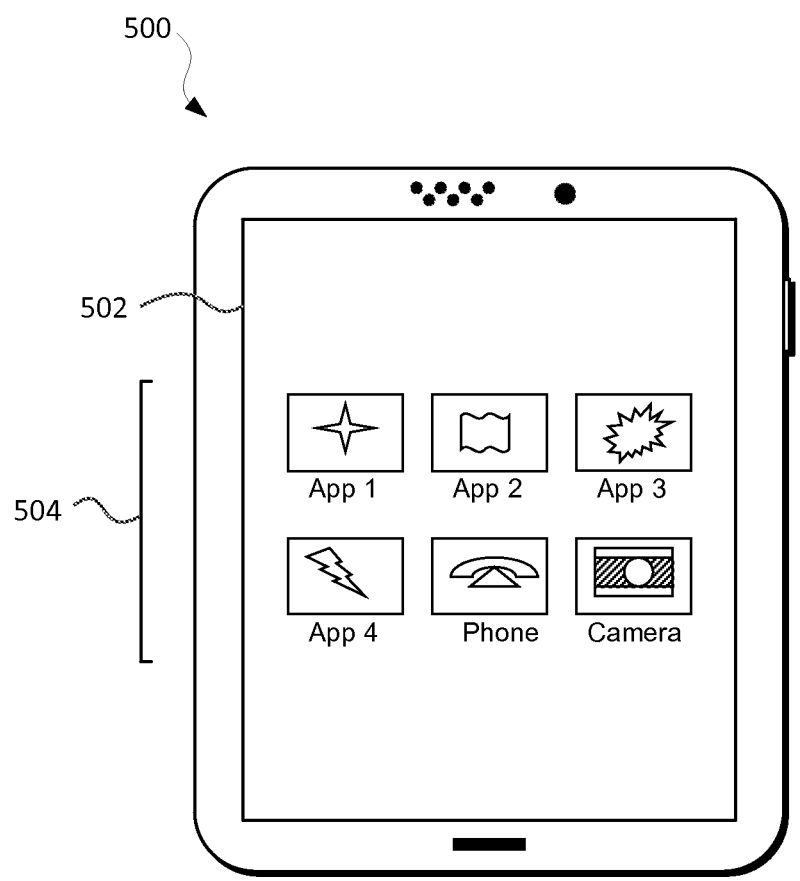
FIG. 5 illustrates an embodiment of a user equipment.

FIG. 5 depicts the user equipment (UE) 500, which is operable for implementing aspects of the present disclosure, but the present disclosure should not be limited to these implementations. Though illustrated as a mobile phone, the UE 500 may take various forms including a wireless handset, a mobile communication device, a pager, a personal digital assistant (PDA), a gaming device, or a media player. The UE 500 includes a touchscreen display 502 having a touch-sensitive surface for input by a user. A small number of application icons 504 are illustrated within the touch screen display 502. It is understood that in different embodiments, any number of application icons 504 may be presented in the touch screen display 502. In some embodiments of the UE 500, a user may be able to download and install additional applications on the UE 500, and an icon associated with such downloaded and installed applications may be added to the touch screen display 502 or to an alternative screen. The UE 500 may have other components such as electro-mechanical switches, speakers, camera lenses, microphones, input and/or output connectors, and other components as are well known in the art. The UE 500 may present options for the user to select, controls for the user to actuate, and/or cursors or other indicators for the user to direct. The UE 500 may further accept data entry from the user, including numbers to dial or various parameter values for configuring the operation of the handset. The UE 500 may further execute one or more software or firmware applications in response to user commands. These applications may configure the UE 500 to perform various customized functions in response to user interaction. Additionally, the UE 500 may be programmed and/or configured over-the-air, for example from a wireless base station, a wireless access point, or a peer UE 500. The UE 500 may execute a web browser application which enables the touch screen display 502 to show a web page. The web page may be obtained via wireless communications with a base transceiver station, a wireless network access node, a peer UE 500 or any other wireless communication network or system.

Figure 6:
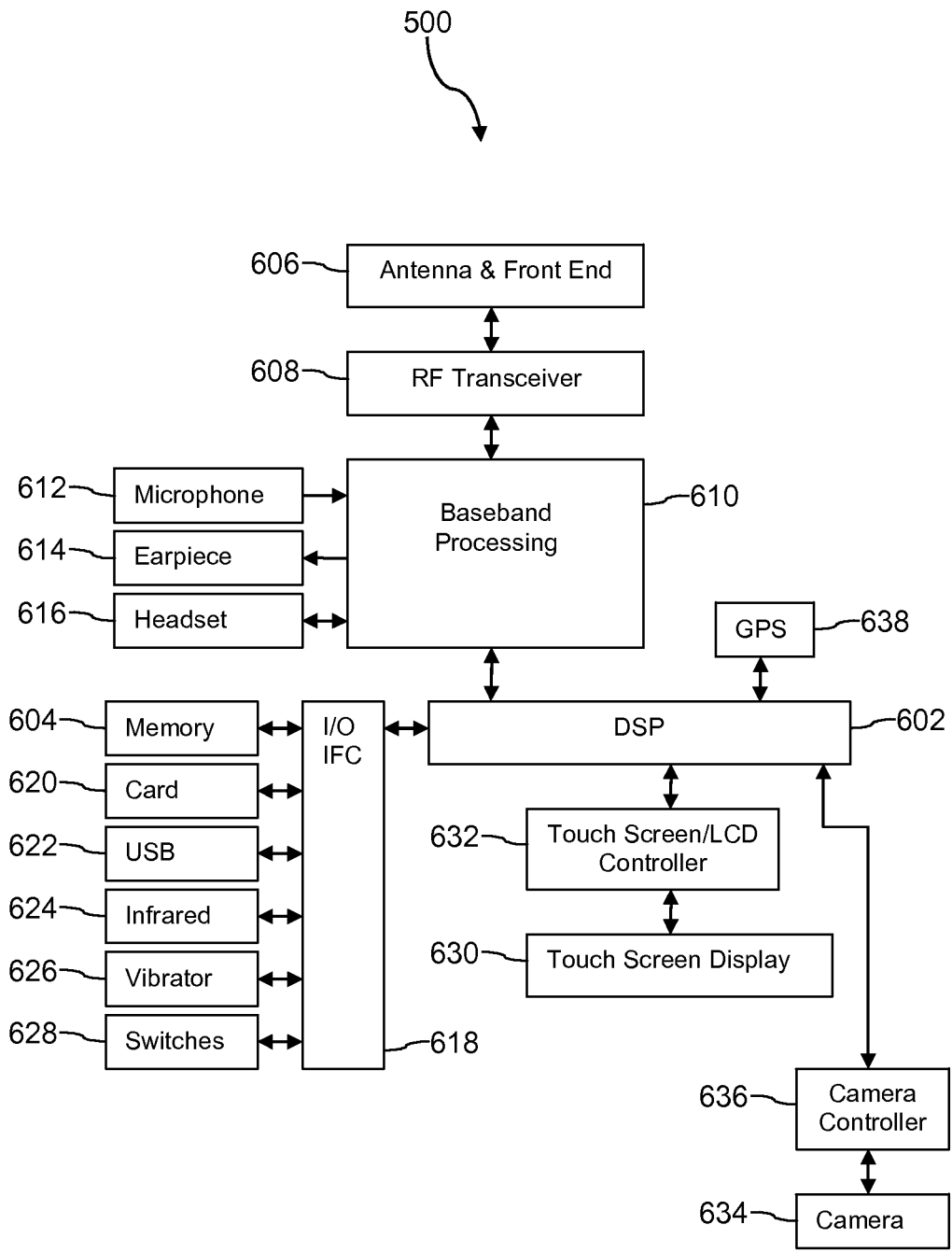
FIG. 6 illustrates an embodiment of a block diagram of the user equipment.

FIG. 6 shows a block diagram of the UE 500. While a variety of known components of handsets are depicted, in an embodiment a subset of the listed components and/or additional components not listed may be included in the UE 500. The UE 500 includes a digital signal processor (DSP) 602 and a memory 604. As shown, the UE 500 may further include an antenna and front end unit 606, a radio frequency (RF) transceiver 608, a baseband processing unit 610, a microphone 612, an earpiece speaker 614, a headset port 616, an input/output interface 618, a removable memory card 620, a universal serial bus (USB) port 622, an infrared port 624, a vibrator 626, one or more electro-mechanical switches 628, a touch screen liquid crystal display (LCD) with a touch screen display 630, a touch screen/LCD controller 632, a camera 634, a camera controller 636, and a global positioning system (GPS) receiver 638. In an embodiment, the UE 500 may include another kind of display that does not provide a touch sensitive screen. In an embodiment, the UE 500 may include both the touch screen display 630 and additional display component that does not provide a touch sensitive screen. In an embodiment, the DSP 602 may communicate directly with the memory 604 without passing through the input/output interface 618. Additionally, in an embodiment, the UE 500 may comprise other peripheral devices that provide other functionality.

The DSP 602 or some other form of controller or central processing unit operates to control the various components of the UE 500 in accordance with embedded software or firmware stored in memory 604 or stored in memory contained within the DSP 602 itself. In addition to the embedded software or firmware, the DSP 602 may execute other applications stored in the memory 604 or made available via information carrier media such as portable data storage media like the removable memory card 620 or via wired or wireless network communications. The application software may comprise a compiled set of machine-readable instructions that configure the DSP 602 to provide the desired functionality, or the application software may be high-level software instructions to be processed by an interpreter or compiler to indirectly configure the DSP 602.

The DSP 602 may communicate with a wireless network via the analog baseband processing unit 610. In some embodiments, the communication may provide Internet connectivity, enabling a user to gain access to content on the Internet and to send and receive e-mail or text messages. The input/output interface 618 interconnects the DSP 602 and various memories and interfaces. The memory 604 and the removable memory card 620 may provide software and data to configure the operation of the DSP 602. Among the interfaces may be the USB port 622 and the infrared port 624. The USB port 622 may enable the UE 500 to function as a peripheral device to exchange information with a personal computer or other computer system. The infrared port 624 and other optional ports such as a Bluetooth® interface or an IEEE 802.11 compliant wireless interface may enable the UE 500 to communicate wirelessly with other nearby handsets and/or wireless base stations. In an embodiment, the UE 500 may comprise a near field communication (NFC) transceiver. The NFC transceiver may be used to complete payment transactions with point-of-sale terminals or other communications exchanges. In an embodiment, the UE 500 may comprise a radio frequency identify (RFID) reader and/or writer device.

The switches 628 may couple to the DSP 602 via the input/output interface 618 to provide one mechanism for the user to provide input to the UE 500. Alternatively, one or more of the switches 628 may be coupled to a motherboard of the UE 500 and/or to components of the UE 500 via a different path (e.g., not via the input/output interface 618), for example coupled to a power control circuit (power button) of the UE 500. The touch screen display 630 is another input mechanism, which further displays text and/or graphics to the user. The touch screen LCD controller 632 couples the DSP 602 to the touch screen display 630. The GPS receiver 638 is coupled to the DSP 602 to decode global positioning system signals, thereby enabling the UE 500 to determine its position.

Figure 7A:
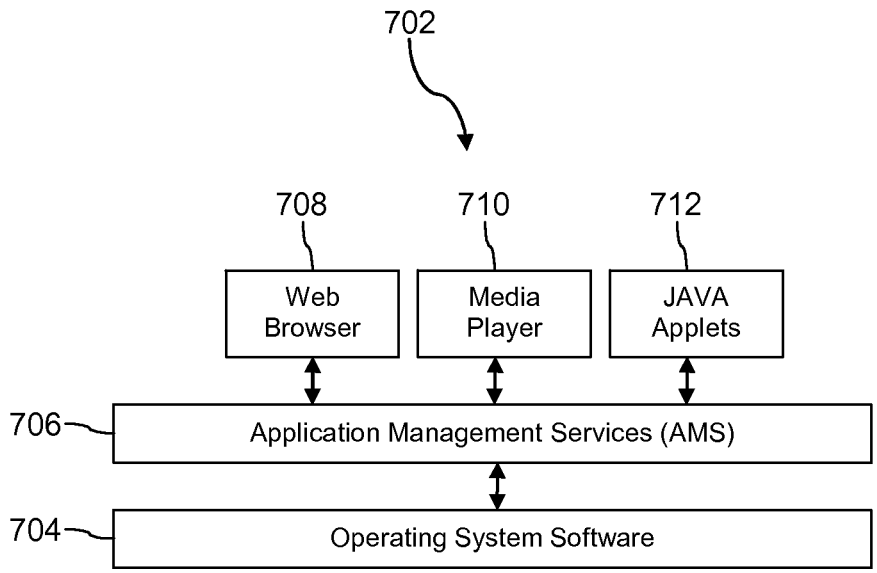
FIG. 7A illustrates an embodiment of a software environment.

FIG. 7A illustrates a software environment 702 that may be implemented by the DSP 602. The DSP 602 executes operating system software 704 that provides a platform from which the rest of the software operates. The operating system software 704 may provide a variety of drivers for the handset hardware with standardized interfaces that are accessible to application software. The operating system software 704 may be coupled to and interact with application management services (AMS) 706 that transfer control between applications running on the UE 500. Also shown in FIG. 7A are a web browser application 708, a media player application 710, and JAVA applets 712. The web browser application 708 may be executed by the UE 500 to browse content and/or the Internet, for example when the UE 500 is coupled to a network via a wireless link. The web browser application 708 may permit a user to enter information into forms and select links to retrieve and view web pages. The media player application 710 may be executed by the UE 500 to play audio or audiovisual media. The JAVA applets 712 may be executed by the UE 500 to provide a variety of functionality including games, utilities, and other functionality.

Figure 7B:
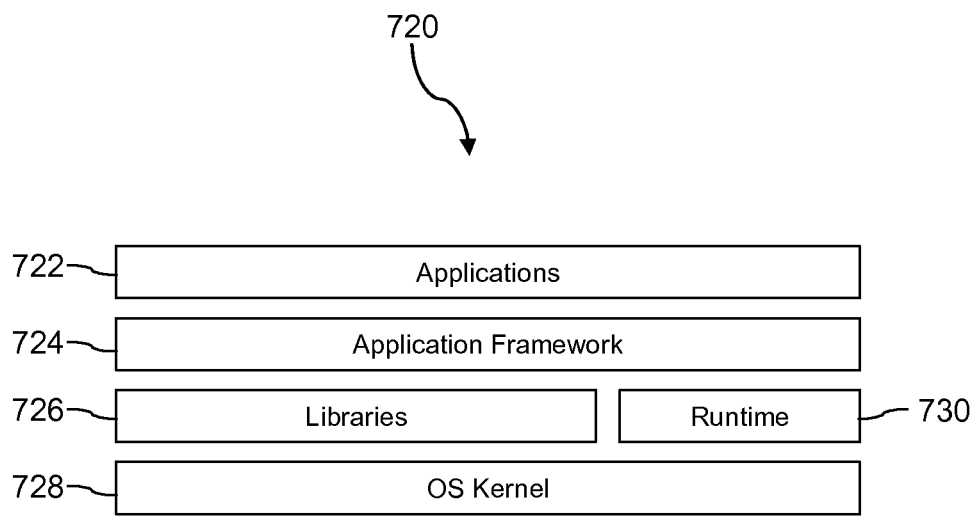
FIG. 7B illustrates an alternative embodiment of a software environment.

FIG. 7B illustrates an alternative software environment 720 that may be implemented by the DSP 602. The DSP 602 executes operating system kernel (OS kernel) 728 and an execution runtime 730. The DSP 602 executes applications 722 that may execute in the execution runtime 730 and may rely upon services provided by the application framework 724. Applications 722 and the application framework 724 may rely upon functionality provided via the libraries 726.

Figure 8:
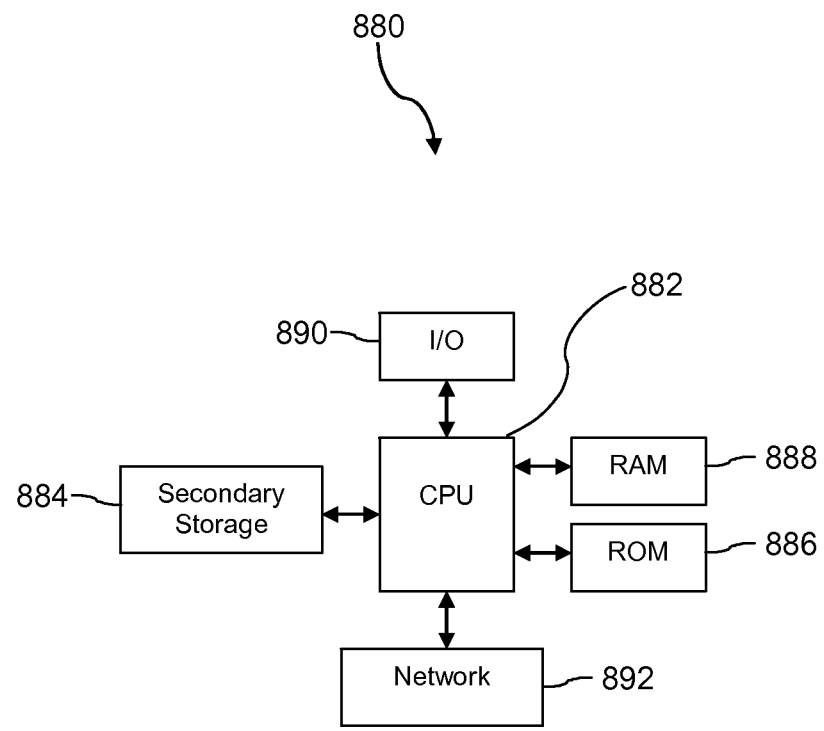
FIG. 8 illustrates an exemplary computer system suitable for implementing the several embodiments of the disclosure.

FIG. 8 illustrates a computer system 880 suitable for implementing one or more embodiments disclosed herein. In some embodiments, the computer system 800 may be referred to as a piece of computing hardware, and/or a piece of network equipment. The computer system 880 includes a processor 882 (which may be referred to as a central processor unit or CPU) that is in communication with memory devices including secondary storage 884, read only memory (ROM) 886, random access memory (RAM) 888, input/output (I/O) devices 890, and network connectivity devices 892. The processor 882 may be implemented as one or more CPU chips.

It is understood that by programming and/or loading executable instructions onto the computer system 880, at least one of the CPU 882, the RAM 888, and the ROM 886 are changed, transforming the computer system 880 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 880 is turned on or booted, the CPU 882 may execute a computer program or application. For example, the CPU 882 may execute software or firmware stored in the ROM 886 or stored in the RAM 888. In some cases, on boot and/or when the application is initiated, the CPU 882 may copy the application or portions of the application from the secondary storage 884 to the RAM 888 or to memory space within the CPU 882 itself, and the CPU 882 may then execute instructions that the application is comprised of. In some cases, the CPU 882 may copy the application or portions of the application from memory accessed via the network connectivity devices 892 or via the I/O devices 890 to the RAM 888 or to memory space within the CPU 882, and the CPU 882 may then execute instructions that the application is comprised of. During execution, an application may load instructions into the CPU 882, for example load some of the instructions of the application into a cache of the CPU 882. In some contexts, an application that is executed may be said to configure the CPU 882 to do something, e.g., to configure the CPU 882 to perform the function or functions promoted by the subject application. When the CPU 882 is configured in this way by the application, the CPU 882 becomes a specific purpose computer or a specific purpose machine.

The secondary storage 884 is typically comprised of one or more disk drives or tape drives and is used for non-volatile storage of data and as an over-flow data storage device if RAM 888 is not large enough to hold all working data. Secondary storage 884 may be used to store programs which are loaded into RAM 888 when such programs are selected for execution. The ROM 886 is used to store instructions and perhaps data which are read during program execution. ROM 886 is a non-volatile memory device which typically has a small memory capacity relative to the larger memory capacity of secondary storage 884. The RAM 888 is used to store volatile data and perhaps to store instructions. Access to both ROM 886 and RAM 888 is typically faster than to secondary storage 884. The secondary storage 884, the RAM 888, and/or the ROM 886 may be referred to in some contexts as computer readable storage media and/or non-transitory computer readable media.

I/O devices 890 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 892 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards that promote radio communications using protocols such as code division multiple access (CDMA), global system for mobile communications (GSM), long-term evolution (LTE), worldwide interoperability for microwave access (WiMAX), near field communications (NFC), radio frequency identity (RFID), and/or other air interface protocol radio transceiver cards, and other well-known network devices. These network connectivity devices 892 may enable the processor 882 to communicate with the Internet or one or more intranets. With such a network connection, it is contemplated that the processor 882 might receive information from the network, or might output information to the network in the course of performing the above-described method steps. Such information, which is often represented as a sequence of instructions to be executed using processor 882, may be received from and outputted to the network, for example, in the form of a computer data signal embodied in a carrier wave.

Such information, which may include data or instructions to be executed using processor 882 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 882 executes instructions, codes, computer programs, scripts which it accesses from hard disk, floppy disk, optical disk (these various disk based systems may all be considered secondary storage 884), flash drive, ROM 886, RAM 888, or the network connectivity devices 892. While only one processor 882 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 884, for example, hard drives, floppy disks, optical disks, and/or other device, the ROM 886, and/or the RAM 888 may be referred to in some contexts as non-transitory instructions and/or non-transitory information.

In an embodiment, the computer system 880 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 880 to provide the functionality of a number of servers that is not directly bound to the number of computers in the computer system 880. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 880, at least portions of the contents of the computer program product to the secondary storage 884, to the ROM 886, to the RAM 888, and/or to other non-volatile memory and volatile memory of the computer system 880. The processor 882 may process the executable instructions and/or data structures in part by directly accessing the computer program product, for example by reading from a CD-ROM disk inserted into a disk drive peripheral of the computer system 880. Alternatively, the processor 882 may process the executable instructions and/or data structures by remotely accessing the computer program product, for example by downloading the executable instructions and/or data structures from a remote server through the network connectivity devices 892. The computer program product may comprise instructions that promote the loading and/or copying of data, data structures, files, and/or executable instructions to the secondary storage 884, to the ROM 886, to the RAM 888, and/or to other non-volatile memory and volatile memory of the computer system 880.

In some contexts, the secondary storage 884, the ROM 886, and the RAM 888 may be referred to as a non-transitory computer readable medium or a computer readable storage media. A dynamic RAM embodiment of the RAM 888, likewise, may be referred to as a non-transitory computer readable medium in that while the dynamic RAM receives electrical power and is operated in accordance with its design, for example during a period of time during which the computer system 880 is turned on and operational, the dynamic RAM stores information that is written to it. Similarly, the processor 882 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. An apparatus, comprising:
   a network communication interface to communicatively couple the apparatus to a network;
   a processor coupled to the network communication interface and comprising a normal partition and a secure partition;
   a memory coupled to the processor and comprising a normal memory and a secure memory;
   a trusted security zone comprising the secure partition and the secure memory, wherein when the processor executes the secure partition, the normal partition is prevented from executing, and wherein the trusted security zone executes a separate operating system that is inaccessible to users of the apparatus; and
   a trusted orchestrator application stored in the secure memory that, when executed by the secure partition of the processor:
      receives fully-detailed data from a virtualized network function of a virtual server via a trusted end-to-end communication link, wherein the data comprises a log of events performed by the virtual network function for a customer, and wherein existence of the fully-detailed data is restricted to the trusted security zone;
      sanitizes the data received from the virtualized network function into sanitized data that is not restricted to the trusted security zone, wherein sanitizing the data received from the virtualized network function removes identifying information of the customer to form the sanitized data; and
      transmits the sanitized data outside of the trusted security zone to a network device for providing services to the customer according to the log of events.

2. The apparatus of claim 1, wherein the apparatus has knowledge of a plurality of virtual network functions operating in the network.

3. The apparatus of claim 1, wherein the trusted orchestrator comprises a billing support system trustlet, and wherein the sanitized data indicates one or more billing events for billing to the customer.

4. The apparatus of claim 1, wherein the trusted orchestrator comprises an operational support system and wherein the sanitized data indicates an activity that should be performed in the network.

5. The apparatus of claim 1, wherein the sanitized data is transmitted by the trusted orchestrator to one of a billing support system or an operational support system outside of the trusted security zone.

6. The apparatus of claim 1, wherein an audit trail is retained in the trusted orchestrator that connects the sanitized data to the fully-detailed data in the virtualized network function.

7. A method executed in a communications network, comprising:
   receiving, by a transceiver in a trusted security zone, a log of event details restricted to the trusted security zone and describing billing events executed by a virtualized network function from the virtualized network function, wherein the billing events indicate events for which a customer should be billed;
   sanitizing, by a processor in the trusted security zone, the log of event details to remove information having a predetermined level of specificity, wherein sanitizing the log of events comprises transforming the log of event details into categories, and wherein sanitizing the log of event details removes identifying information of the customer to form a sanitized log of event details; and
   transmitting by the transceiver, the sanitized log of event details,
   wherein the processor comprises a secure partition and a normal partition, and the trusted security zone comprises the secure partition,
   wherein when the processor executes the secure partition in the trusted security zone, the processor is prevented from executing the normal partition outside of the trusted security zone, and
   wherein the trusted security zone executes a separate operating system that is inaccessible to device users.

8. The method of claim 7, wherein the method is executed on a trusted orchestrator in a network function virtualization architecture.

9. The method of claim 8, wherein the trusted orchestrator comprises a billing support system.

10. The method of claim 8, wherein the sanitized log of event details is converted by the trusted orchestrator into a bill prior to transmission to the customer.

11. The method of claim 7, wherein the categories comprise at least one of a measurement of the customer's network usage comprising a count of cycles used, a count of data throughput, a count of time slots used, a count of process cycles used, a count of minutes consumed, a count of message throughput, a count of events transacted, a count of applications initiated, and a count of services terminated.

12. The method of claim 7, wherein the categories comprise a quality of service provided to the customer.

13. The method of claim 7, wherein the categories comprise a listing of services consumed by the customer and selected from a services catalog.

14. The method of claim 7, wherein the level of specificity to be removed when sanitizing the log of event details is dependent on specifications of the trusted security zone that must be maintained to ensure trust is preserved.

15. A method executed in a communications network, comprising:
- receiving, by a transceiver in a trusted security zone, a log of event details restricted to the trusted security zone and describing network events executed by a virtualized network function from the virtualized network function, wherein the network events indicate a network activity that should take place on a network;
- receiving from an outside network device, a predetermined level of specificity for information that should be removed from the log of event details;
- sanitizing, by a processor in the trusted security zone, the log of event details to remove information having the received predetermined level of specificity, wherein sanitizing the log of event details removes identifying information of a customer to form a sanitized log of event details; and
- transmitting by the transceiver, the sanitized log of event details to the outside network device,
- wherein the processor comprises a secure partition and a normal partition, and the trusted security zone comprises the secure partition,
- wherein when the processor executes the secure partition in the trusted security zone, the processor is prevented from executing the normal partition outside of the trusted security zone, and
- wherein the trusted security zone executes a separate operating system that is inaccessible to device users.

16. The method of claim 15, wherein the method is executed on a trusted orchestrator in a network function virtualization architecture.

17. The method of claim 15, wherein the trusted orchestrator comprises an operational support system trustlet.

18. The method of claim 15, wherein the network activity indicates service is required on a portion of the network.

19. The method of claim 18, wherein sanitizing the log of events comprises removing all non-essential information from the log of events such that only a minimum amount of information necessary to identify the portion of the network requiring service remains.

20. The method of claim 15, wherein the network activity comprises provisioning a service for the customer.

* * * * *